Patented Apr. 24, 1928.

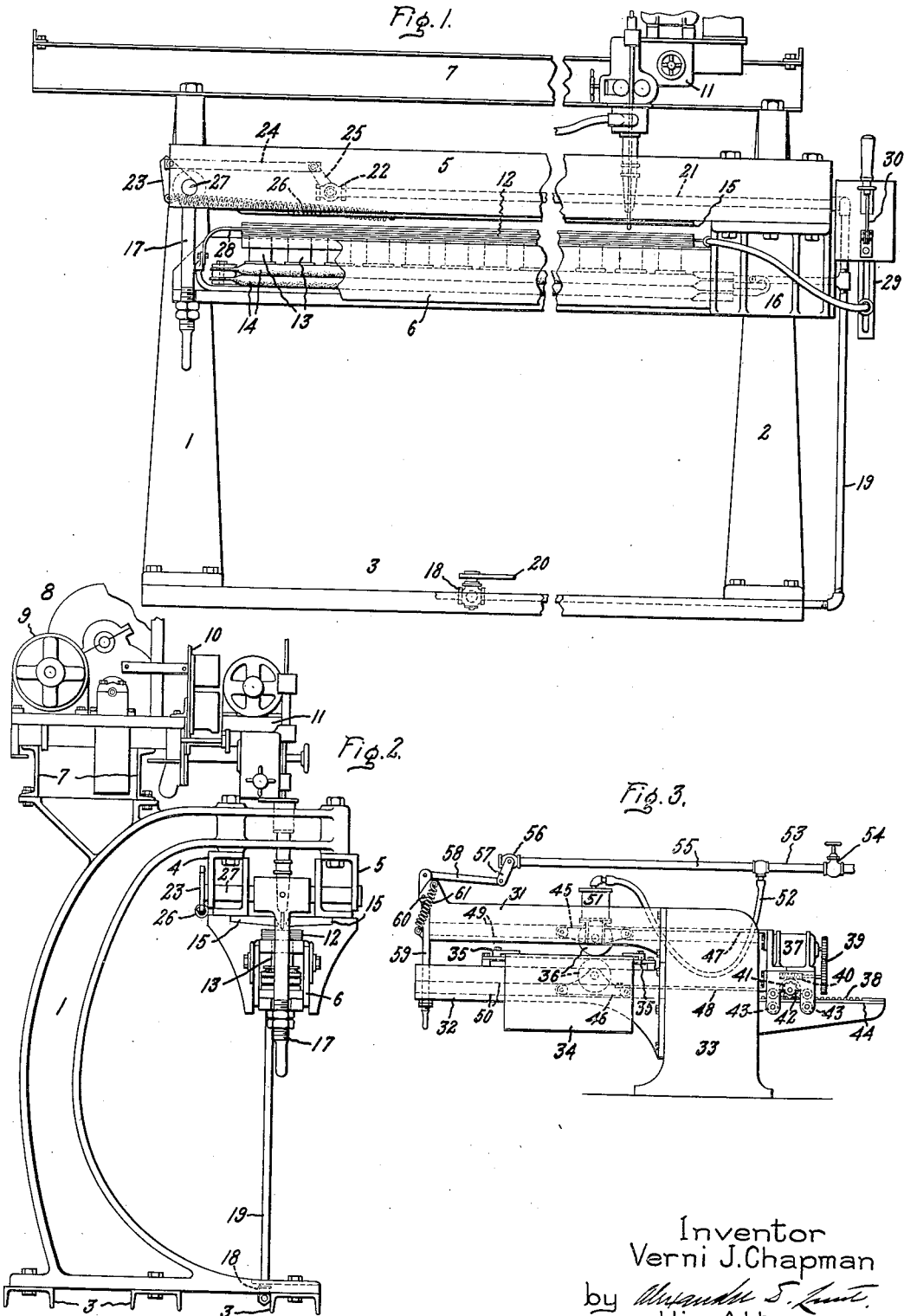

1,667,587

UNITED STATES PATENT OFFICE.

VERNI J. CHAPMAN, OF SCHENECTADY, NEW YORK, ASSIGNOR TO GENERAL ELECTRIC COMPANY, A CORPORATION OF NEW YORK.

WELDING MACHINE.

Application filed August 30, 1926. Serial No. 132,379.

My invention relates to improvements in welding machines, and particularly to means for preventing the operation of a pressure member of a machine until that part of the machine against which the pressure is exerted directly or indirectly is braced by a means made removable for purposes of convenience or necessity.

While my invention is particularly useful in welding machines and I have shown it embodied in welding machines adapted for arc welding and for resistance welding, it is to be understood that my invention is applicable to other relations of utility.

My invention will be better understood from the following description when considered in connection with the accompanying drawing, and its scope will be pointed out in the appended claims.

Referring to the drawing, Fig. 1 shows a side view of an automatic metallic arc welding machine in which my invention has been embodied, and Fig. 2 is an end view of the same machine. Fig. 3 is a side view of a machine adapted for resistance line welding in which my invention has been embodied.

Automatic metallic arc welding requires, in addition to the source of welding current, three elements; a welding head by means of which the electrode is automatically fed to the arc, a travel carriage to move the welding head and work relatively and guide the electrode along the seam to be welded, and a clamping device or means for holding in position the parts to be welded. These three elements have been combined in the complete machine illustrated in Figs. 1 and 2, and my invention has been embodied in that part of the machine which comprises the clamping device.

The particular machine illustrated is adapted for welding the longitudinal seams of tanks wherein the edges of the seam are held firmly in position while a member is held tightly against the under side of the seam to back up the weld and prevent the molten metal from running through and producing irregular beads along the inside of the seam and also to prevent the arc from burning through the metal at the seam. This machine comprises vertical frame members 1 and 2 bolted to a base formed by channel members 3 and supporting horizontal beams 4, 5 and 6, between which the work is clamped, and a track 7 for the welding carriage 8. This welding carriage is shown as provided with a motor 9, by which it is propelled along the track 7, a meter board 10, and a welding head 11. The welding head is of any suitable construction for controlling the arc by automatically feeding the electrode to maintain the arc at substantially constant length, notwithstanding the consumption of the electrode.

The clamping mechanism comprises horizontal beams 4, 5 and 6, two of which are above the third and so arranged that when the backing member 12, which is located within the lower beam 6, is forced against the under side of the work by plungers 13 which rest upon distensible hose sections 14 extending along beam 6 and supported therein, the work will be forced against two copper jaw members 15 attached to beams 4 and 5 and thus held in place. The two upper beams 4 and 5 are attached at their respective ends to the vertical frame members 1 and 2 of the welding machine, and the lower beam 6, which acts as an abutment, is attached at one end to the framework of the machine by a metallic yoke 16 attached to the upper beams 4 and 5. The other end of beam 6 is supported by reinforcing or bracing means shown as a latch bolt 17 pivoted by a shaft 27 between beams 4 and 5 so that it may be swung clear of the opening between beams 4, 5 and 6 for the insertion and removal of work, while normally it will be in the position illustrated to support the end of beam 6.

Air or other suitable operating fluid is supplied to the hose sections 14 through a three-way valve 18 which in one position admits pressure from a suitable source, not shown, to the pipe line 19 to distend these sections and thus force the plungers 13 in an upward direction to clamp the work in the manner previously set forth. The clamp is opened by releasing the air pressure by moving the three-way valve 18 to a position where it closes the port to the source and connects the pipe 19 to an exhaust port. This valve is provided with a lever 20 and is preferably located at the base of the machine, where the operator may readily operate it by means of his foot. Connected to the pipe line 19 is a second pipe line 21 which terminates with a valve 22 which in its open position will bypass the operating fluid from the clamping mechanism and thus render it inoperative. The latch bolt 17 is interlocked with this valve 22 through links 23, 24 and 25 in such a manner that, when latch bolt 17 is swung free of the opening between beams 4, 5 and 6, the valve 22 will be in its open position. As a result of this, it will be noted that the clamping mechanism for holding the work cannot be operated until the latch bolt 17 is swung to the indicated position to support the end of beam 6. This will prevent the operator from accidentally operating the clamping mechanism when the parts are not rigidly supported in such a manner as suitably to resist the clamping forces. A spring 26 is connected by link 23 attached to shaft 27 of latch bolt 17 and to the beam 4 in such a manner as to hold the latch bolt 17 in an elevated position or to aid in its closure.

The backing member 12 illustrated in this machine is of improved construction and comprises an insulated conductor 28 extending along its length and in proximity to its work-engaging surface through which a portion of the welding current or current from a suitable source is directed to establish a field that will eliminate the harmful effects of stray fields on the welding arc and at the same time give the welding arc a forward lead in the direction of its travel along the work. In the illustrated machine a portion of the welding current is sent through the insulated conductor 28. The amount of welding current sent through the conductor is controlled by the adjustment of a variable rheostat 29 connected in its circuit. A switch 30 is provided for shunting the welding current from the conductor 28 at the beginning of the welding operation and is opened after the weld has progressed a few inches. This method of magnetically controlling the arc and the means illustrated are more fully described in application Serial No. 126,395, of Carl L. Ipsen, electric arc welding, filed August 2, 1926, and assigned to the same assignee as the present application. Since it forms no part of the present invention, I do not consider it necessary to go further into the description of this part of the machine.

Referring to Fig. 3, which shows the application of my invention to a machine adapted for resistance line welding, two projecting arms 31 and 32 are supported by a pedestal 33 and spaced apart to receive the work shown as a tank 34. Suitable means 35 are provided for clamping the tank to arm 32 during the welding operation. The welding current is supplied to the work through electrodes 36 from a source not shown. Relative movement between the electrodes 36 and work 34 is produced by means of a motor 37 geared to the rack 38 through gears 39, a worm 40, worm gear 41, and gear 42 which is arranged to cooperate with the rack 38 to move the motor 37 and the carriage upon which it is mounted to and fro along the rack 38. Rollers 43 are arranged to contact with opposite sides of projections 44 placed on the sides of the rack 38 for preventing vertical movement of the motor carriage which is coupled to the electrode carriages 45 and 46 through suitable longitudinal members 47 and 48. The wheels of electrode carriage 45 are arranged to move along arm 31 in a trackway indicated by dotted lines 49, and the wheels of electrode carriage 46 are arranged likewise to move along arm 32 in a trackway indicated by dotted lines 50. The upper electrode 36 is arranged to be moved into and out of engagement with the work by means of a fluid pressure device 51. Fluid pressure is supplied to this pressure device 51 through a flexible hose 52 connected to a pipe line 53 provided with a valve 54 for controlling the admission of fluid. Pipe line 53 is extended by a section 55 forming a bypass to the hose 52 and is provided at its extremity with valve 56 connected by links 57 and 58 to the projecting end of the latch bolt 59 which is pivoted to the upper arm member 31 at 60. This latch bolt 59 is provided with a spring 61 which is attached to the latch bolt 59 and the arm 51 in such a manner as to hold the latch bolt 59 in an elevated position or to assist in its closure to the position illustrated in the drawing. The latch bolt 59 and the valve 56 are so connected that when the latch bolt 59 is not in its illustrated position, valve 56 will be open and thus prevent the operation of fluid pressure device 51 by bypassing the operative fluid therefrom. It will thus be seen that in this embodiment of my invention, as in that embodiment previously described in connection with Figs. 1 and 2, that it is impossible to exert pressure upon a member of a machine that is normally braced by another member until the other member is in its operative position.

Although the machines illustrating the application of my invention are welding machines adapted for uniting metals by either the arc or resistance method, it is to be understood that in its more general aspects the invention is not limited to machines adapted for welding, but may be applied to any machine having an arrangement of parts similar to those in the machines illustrated. Although in the machines illustrated pressure is exerted through the agency of a fluid medium, it is to be understood that the invention is not thus limited, for the pressure members of machines may be variously operated through mechanical or electrical means, or both. If, for example, electrical means were used, the latch bolt in the illustrated machines, or more generally the bracing means for supporting the pressure receiving member of the machine, would be interlocked either electrically or mechanically with the electrical circuit controlling the operation of the pressure means to insure that the latch bolt or bracing means was in operative relation before the pressure member was operated.

The embodiments of my invention illustrated and described herein have been selected for the purpose of clearly setting forth the principles involved. It will be apparent, however, that my invention is susceptible of being modified to meet the different conditions encountered in its use, and I therefore aim to cover by the appended claims all modifications within the true spirit and scope of my invention.

What I claim as new and desire to secure by Letters Patent of the United States, is:

1. Apparatus comprising a pressure member, means for actuating said pressure member, a supporting arm for said actuating means, a second arm against which said pressure member acts, means for supporting said arms in spaced relationship with one end of one of said arms free of external support, removable means for reinforcing the free end of said arm, and means operated by the movement of said reinforcing means to prevent the actuation of said pressure member until said reinforcing means is in operative position.

2. Apparatus comprising a pressure member, means for actuating said pressure member, a supporting arm for said actuating means, a second arm against which said pressure member acts, means for supporting said arms in spaced relationship with one end of one of said arms free of external support, removable means for holding said arms in fixed relation with respect to each other, and means operated by the movement of said holding means for rendering said actuating means inoperative until said holding means is in operative position.

3. Apparatus comprising a pressure member, means for actuating said pressure member, a supporting arm for said actuating means, a second arm against which said pressure member acts, means for supporting said arms in spaced relationship with one end of one of said arms free of external support, a brace extending between said arms pivotally attached to one of said arms for reinforcing the free end of said arm, and means operated by the movement of said brace for rendering said actuating means inoperative until said brace is in a position to hold said arms against the force exerted by said pressure member and its actuating means.

4. A welding machine comprising a flexible backing member adapted to contact with the parts to be welded, means arranged to be operated by fluid pressure for forcing said backing member into the irregularity of said parts, a support for said fluid pressure means, removable means for reinforcing said support, and means operated by the movement of said reinforcing means for rendering said fluid pressure means inoperative unless said reinforcing means is in operative position relative to said support.

5. A welding machine comprising a holding member, a flexible backing member adapted to contact with the parts to be welded, means arranged to be operated by fluid pressure for forcing said parts into contact with said holding member and said backing member into the irregularity of said parts, a support for said fluid pressure means, removable means for reinforcing said support, and means operated by the movement of said reinforcing means for rendering said fluid pressure means inoperative unless said reinforcing means is in operative position relative to said support.

6. Welding apparatus comprising holding members extending along the line of the seam to be welded, a flexible backing member adapted to contact with the parts to be welded, means arranged to be operated by fluid pressure for forcing said parts into contact with said holding members and for forcing said backing member into the irregularities of said parts, a support for said backing member and said fluid pressure means, bracing means for holding said support in fixed relation with respect to said holding members and adapted to be removed from the opening between said support and said holding members for the insertion and removal of work, and a fluid bypass operated by the movement of said bracing means for rendering said fluid pressure means inoperative unless said bracing means is in a position to hold said support and said holding members against the force exerted by said pressure means.

In witness whereof, I have hereunto set my hand this 28th day of August, 1926.

VERNI J. CHAPMAN.